(12) United States Patent  
Case (10) Patent No.: US 7,344,115 B2
(45) Date of Patent: Mar. 18, 2008

(54) SPECIALIZED OUTLET BOX MOUNTING BRACKET

(76) Inventor: Gerald Case, 24812 Hon Ave., Laguna Hills, CA (US) 92653

( * ) Notice: Subject to any disclaimer, the term of this patent is extended or adjusted under 35 U.S.C. 154(b) by 0 days.

(21) Appl. No.: 11/226,774

(22) Filed: Sep. 13, 2005

(65) Prior Publication Data

US 2007/0057132 A1    Mar. 15, 2007

(51) Int. Cl.
*A47F 5/00* (2006.01)
(52) U.S. Cl. .................. 248/300; 248/906; 174/50
(58) Field of Classification Search ............. 248/906, 248/27.1, 27.3, 300; 174/48, 50, 53, 57
See application file for complete search history.

(56) References Cited

U.S. PATENT DOCUMENTS

| | | | |
|---|---|---|---|
| 1,066,706 A | 7/1913 | Caine | |
| 1,156,885 A | 10/1915 | Caine | |
| 2,042,620 A * | 6/1936 | Noyes | 174/58 |
| 4,757,967 A | 7/1988 | Delmore et al. | 248/218.4 |
| 4,863,399 A * | 9/1989 | Medlin, Jr. | 439/538 |
| 5,232,185 A * | 8/1993 | Schorr et al. | 248/27.3 |
| 5,405,111 A | 4/1995 | Medlin, Jr. | 248/205.1 |
| 6,209,836 B1 * | 4/2001 | Swanson | 248/300 |
| 6,239,365 B1 | 5/2001 | McEvers | 174/50 |
| 7,053,300 B2 * | 5/2006 | Denier et al. | 174/58 |
| 7,109,414 B2 * | 9/2006 | Reynolds | 174/50 |

* cited by examiner

Primary Examiner—Amy J. Sterling
(74) Attorney, Agent, or Firm—Steins & Associates, P.C.

(57) ABSTRACT

A Specialized Outlet Box Mounting Bracket is disclosed. The bracket provides a convenient mounting platform for a 3½ inch deep outlet box within a conventional stud wall. The bracket eliminates the requirement for special, labor-intensive installation methods by installing easily between a pair of structural studs at standard spacing. The bracket further provides two installation options—one for a single-sheet drywall wall construction, and an additional one for a double-sheet drywall wall construction. The bracket's outlet box reservoirs are configured to provide rigid backing support for the deep outlet boxes with the bracket being stamped out of a single piece of flat metal stock, and therefore being extremely material-efficient.

18 Claims, 7 Drawing Sheets

SPECIALIZED OUTLET BOX MOUNTING BRACKET

BACKGROUND OF THE INVENTION

1. Field of the Invention

This invention relates generally to electrical enclosures and related structures and, more specifically, to a Specialized Outlet Box Mounting Bracket.

2. Description of Related Art

Figure 1A:
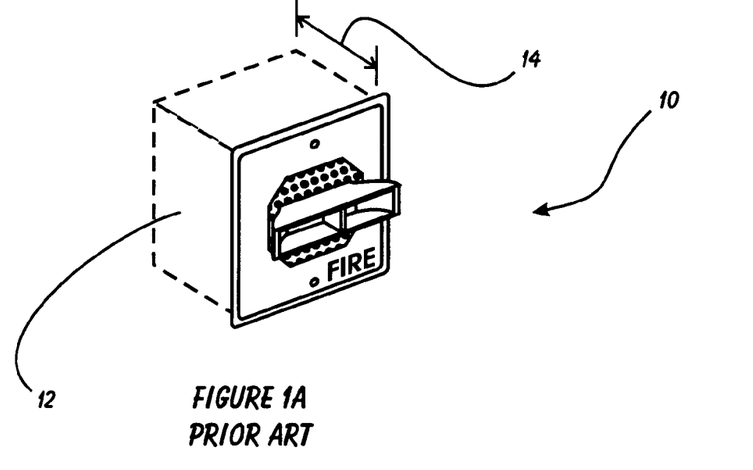
FIG. 1A is a perspective view of a conventional junction box assembly and fire alarm assembly.
Figure 1B:
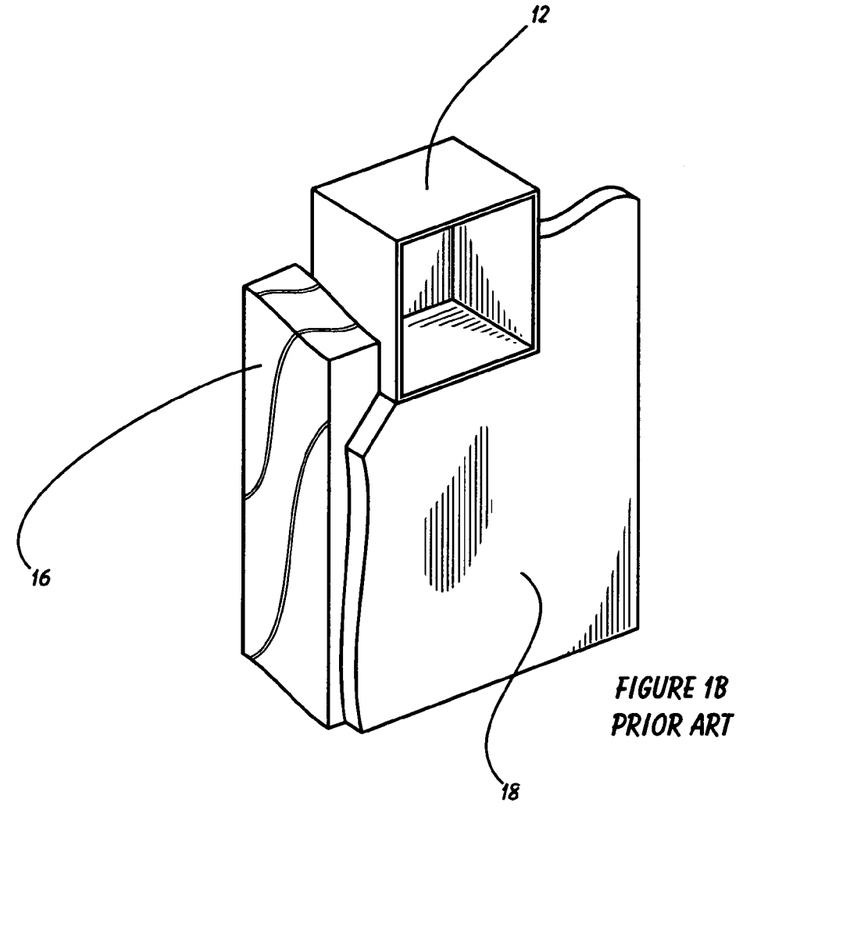
FIG. 1B is a perspective view of a conventional junction box assembly as it is installed within a stud wall.

Recent developments related to the wiring requirements for institutional fire alarm systems has created a unique problem in the construction industry. Institutional fire alarm assemblies are (typically wall-mounted) audio and visual alarm locations located throughout commercial and institutional buildings. A typical fire alarm assembly and junction box ("outlet box") are shown in FIG. 1A. Under previous building standards, the electrical junction boxes 12 used for fire alarm assemblies 10 was a conventional square junction box having a depth 14 of 2⅛ inches deep. These "shallow" boxes have conventionally been attached to framing studs during construction via a bracket system such as that described by Delmore et al., U.S. Pat. No. 4,757,967. The Delmore bracket enabled the shallow box to be quickly mounted between a pair of conventional framing studs quickly, and still permitted the box 12 to be slid from side to side in order to place it in exactly the desired position between the studs. FIG. 1B depicts a outlet box assembly 12 if mounted directly to a stud 16 without the benefit of the Delmore bracket. Clearly, once installed, the surface of the studs is covered with one or two layers of drywall 18.

Figure 2:
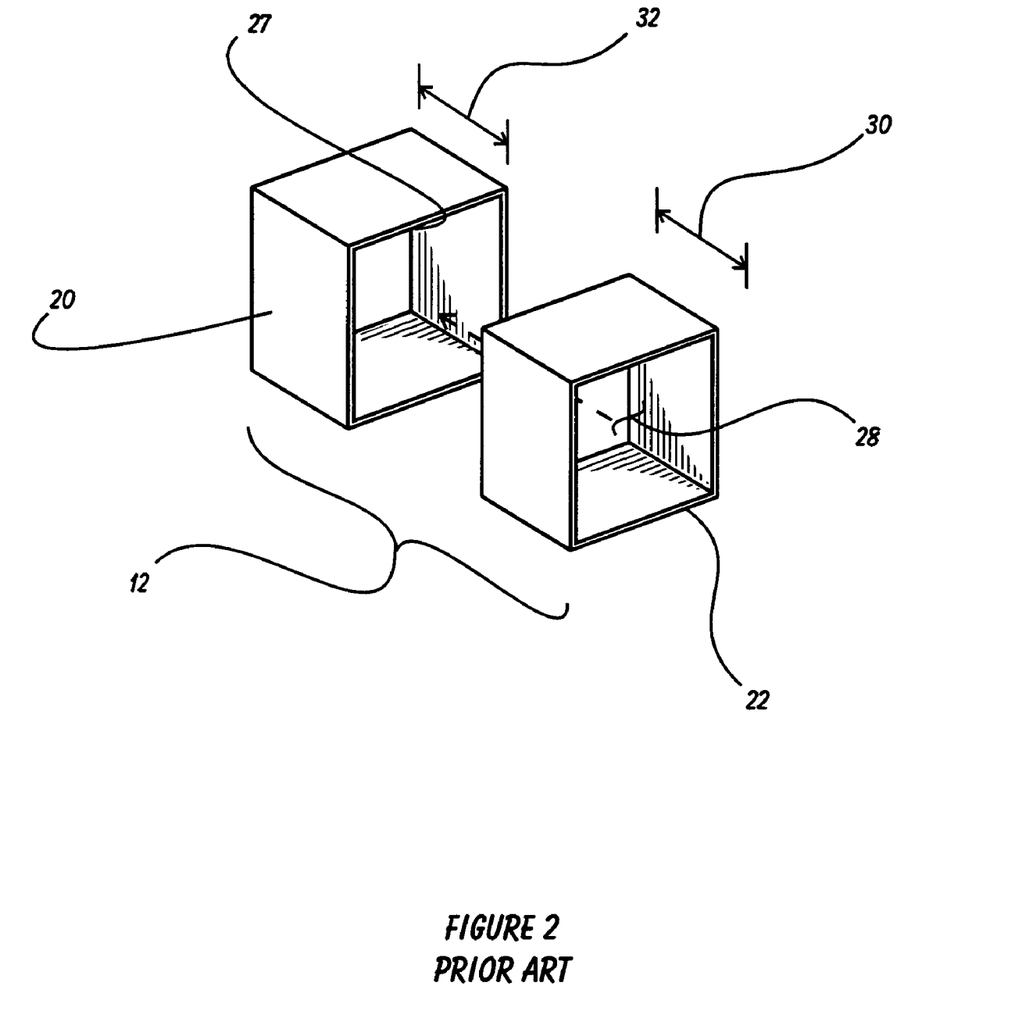
FIG. 2 is a perspective view of a conventional box extender used with a shallow junction box.

With the new requirements, a box depth of 3½ inches is mandated. This has made the old shallow box difficult to use, and the new deeper box hard to install. FIG. 2 depicts one approach to using a shallow box to provide adequate overall box depth. Items called "box extenders" 22 are available for increasing the depth of the conventional shallow boxes. The box extender 22 is basically the same shape and size as the outlet box 20, but without a back (i.e. the back is open). It is fastened to the front of the outlet box 20 with the available screws. When the outlet box assembly 12 is complete, the depth of the assembly 12 will be equal to the outlet box depth 32 plus the box extender depth 30.

The problem with using a box extender 22 is that the box extender 22 does not mount exactly square with the outlet box 20, and therefore leaves the fire alarm assembly out of level. Correcting this lack of level requires considerable effort, many times to include removing drywall, straightening the box, then patching the drywall and finish texture.

What is needed, therefore, is a mounting device and/or system that makes installation of the new, deeper fire alarm assembly outlet boxes to be more easily installed.

SUMMARY OF THE INVENTION

In light of the aforementioned problems associated with the prior devices and systems, it is an object of the present invention to provide a Specialized Outlet Box Mounting Bracket. The bracket should be configured to provide a convenient mounting platform for a 3½ inch deep outlet box within a conventional stud wall. The bracket should eliminate the requirement for special, labor-intensive installation methods by installing easily between a pair of structural studs at standard spacing. The bracket should further provide two installation options—one for a single-sheet drywall wall construction, and an additional one for a double-sheet drywall wall construction. The bracket's outlet box reservoirs should be configured to provide rigid backing support for the deep outlet boxes with the bracket being stamped out of a single piece of flat metal stock, and therefore being extremely material-efficient.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Specialized Outlet Box Mounting Bracket. Throughout the ensuing description, the term "Outlet box" will be used extensively an is intended to mean "junction box" in each use.

Figure 3:
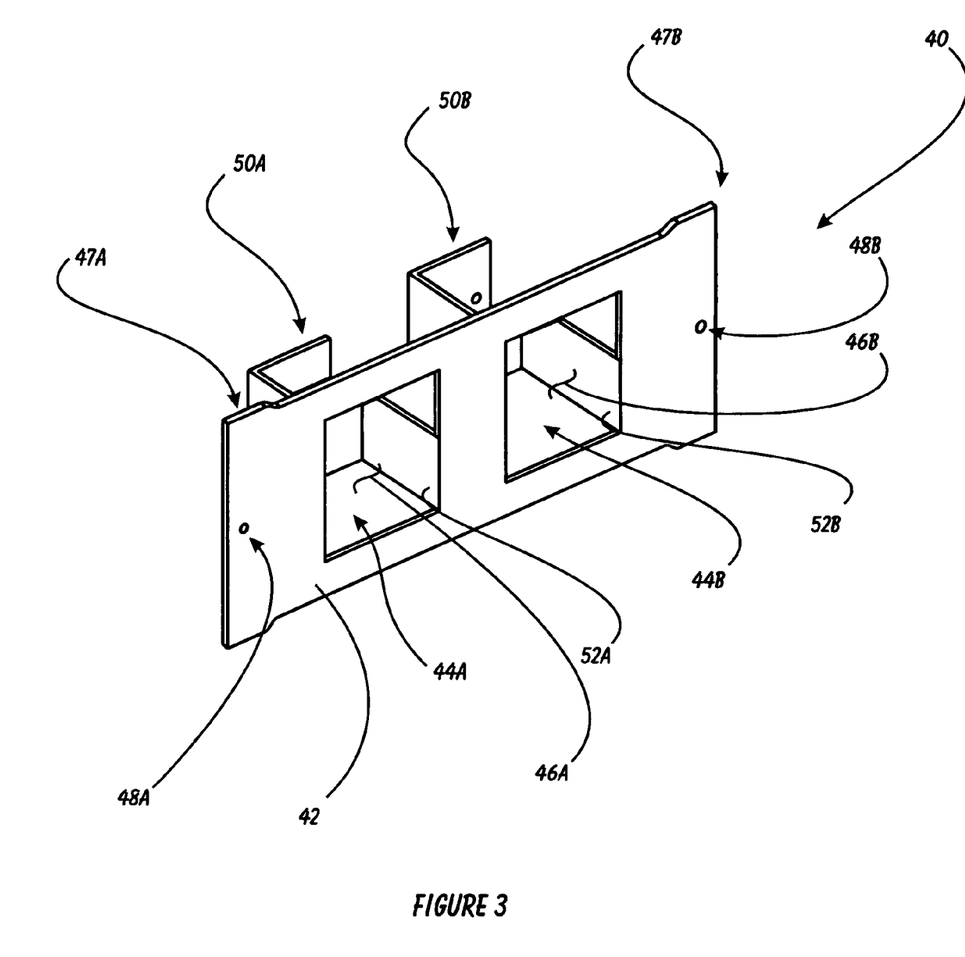
FIG. 3 is a perspective view of a preferred embodiment of a specialized junction box mounting bracket of the present invention.

The present invention can best be understood by initial consideration of FIG. 3. FIG. 3 is a perspective view of a preferred embodiment of a specialized junction box mounting bracket 40 of the present invention. The bracket 40 is preferably formed from a single sheet of galvanized steel or other suitable material in order to provide a versatile, strong, yet low-cost device. The bracket 40 is defined by a face plate 42 having a first mounting fin 47A and a second mounting fin 47B extending from opposite sides thereof. Each mounting fin 47 has at least one mounting aperture (e.g. 48A and 48B) formed in it for easy installation into a framing stud when the mounting bracket 40 is used. The fins 47 and apertures 48 are in spaced relation to cooperate with conventional framing spacing, such as at sixteen inches on-center.

The face plate 42 has a first outlet box aperture 46A formed in it. A first outlet box reservoir 44A is accessed through this aperture 46A. The aperture 46A is dimensioned to accept a new deep outlet box therein. An outlet box inserted into the reservoir 44A is retained in place by a first upper L-bracket 50A and a first lower L-bracket 52A extending backwardly from the face plate 42. To reduce material costs and manufacturing costs, the first and second L-brackets are actually formed from the material cut from the face plate 42 in order to form the first outlet box aperture 46A. Each L-bracket is only cut on three sides and then pressed into the L-shaped form shown.

Similarly, a second outlet box aperture 46B is cut into the face plate 42 beside the first outlet box aperture 46A. A second outlet box reservoir 44B is accessible through the second outlet box aperture 46B, and is bounded by a second upper L-bracket 50B and a second lower L-bracket 52B. The two L-brackets 50B and 52B are also preferably formed from the material cut to make the second outlet box aperture 46B. The second outlet box reservoir 44B is configured to accept and support a new deep-depth outlet box therein.

The two reservoirs 44A and 44B are of differing depths so that the bracket 40 can accommodate walls having either a single layer of drywall or a double layer of drywall. One of the reservoirs will have a depth of about 2.25 inches to accommodate an outlet box having a depth of 3.5 inches that will protrude 1.25 inches beyond the face of the studs (allowing for two layers of 0.75 inch drywall); another of the reservoirs will have a depth of about 2.75 inches so that the deep outlet box will protrude 0.75 inches beyond the face of the studs to allow for one layer of drywall. Of course, the bracket can be flipped over (side-for-side) so that the reservoir having the desired depth is either on the right or the left. Now turning to FIG. 4, we can continue to examine this novel and very useful device.

Figure 4:
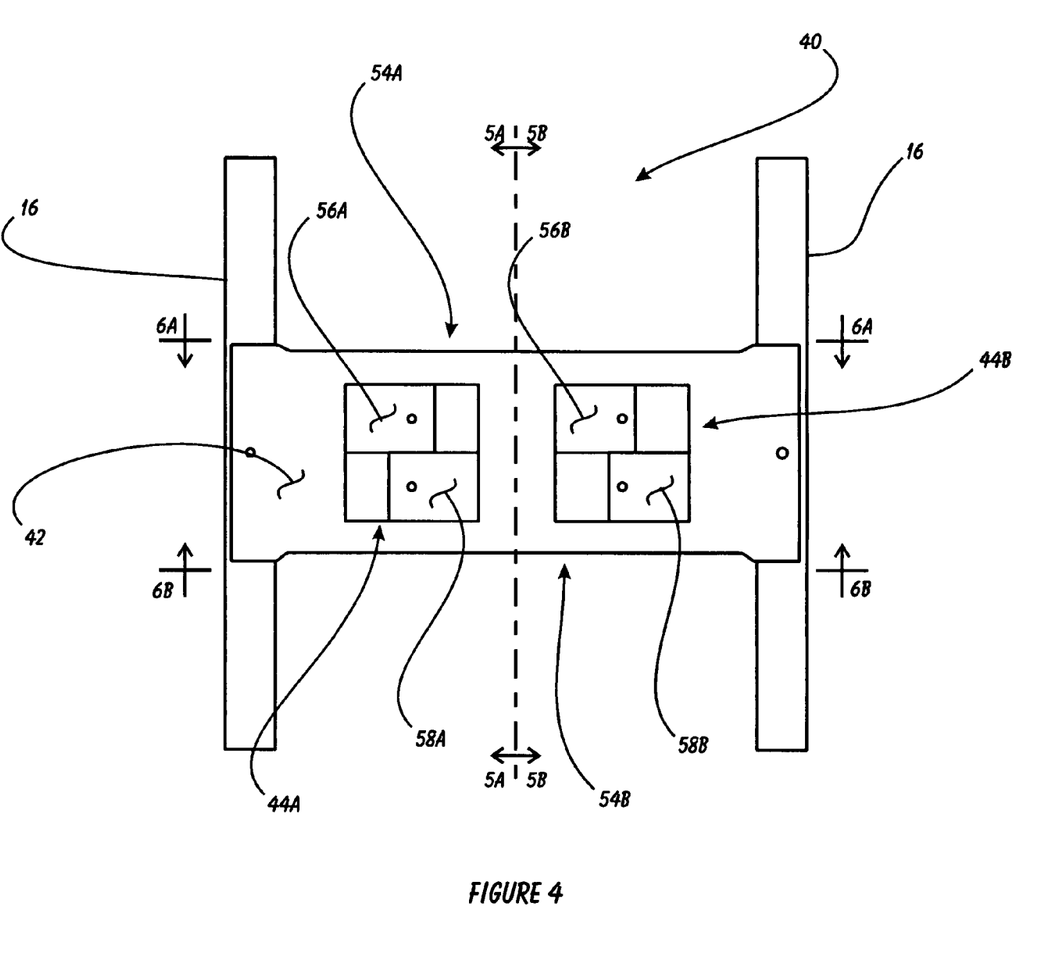
FIG. 4 is a front view of the mounting bracket of FIG. 3.

FIG. 4 is a front view of the mounting bracket 40 of FIG. 3. The bracket 40 is shown as it would be installed between a pair of studs 16 in a conventional stud wall. Fasteners would be driven through the mounting apertures formed on the mounting fins to secure the bracket 40 in place.

As can be seen here, the backing plates 56A, 58A are of different lengths than the backing plates 56B and 58B. This is because more material is used for the side plates in the second outlet box reservoir 44B than is used for the first outlet box reservoir 44A. Each of the backing plates 56A, 56B, 58A and 58B have apertures formed in them to accommodate fasteners passing therethrough to secure the outlet box to the backing plates.

Figures 5A, 5B:
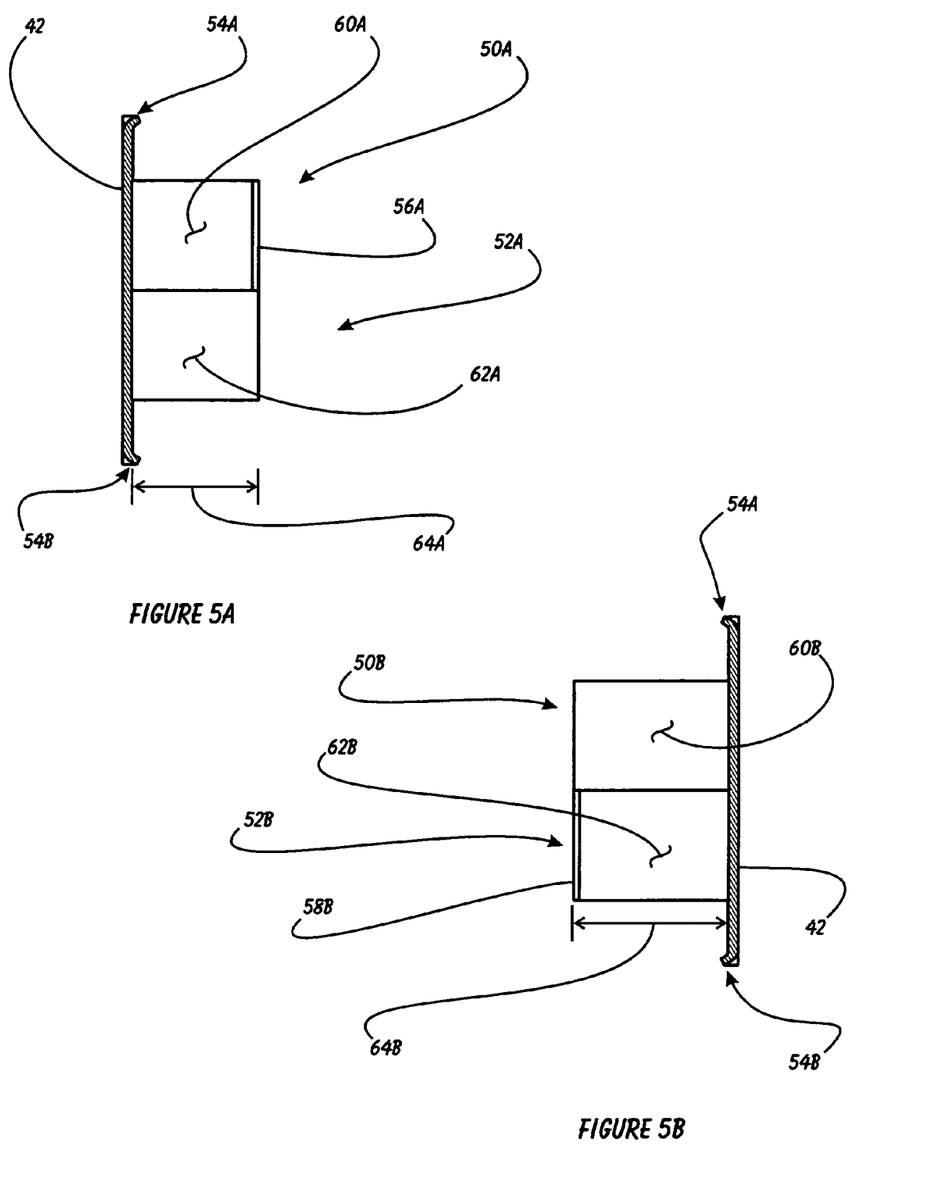
FIGS. 5A and 5B are cutaway side views of the bracket of FIGS. 3 and 4.

Also depicted in this view are the upper stiffening lip 54A and the lower stiffening lip 54B. These lips 54 are formed by slightly bending back the face plate 42 along the top and bottom edges, while leaving the side mounting fin areas unbent. The stiffening lips 54A and 54B provide desired rigidity to the bracket 40 without the need for complex structure or manufacturing processes. Turning to FIGS. 5A and 5B, we can continue to examine this unique structure.

FIGS. 5A and 5B are cutaway side views of the bracket 40 of FIGS. 3 and 4. Two features are clear here—that the first reservoir depth 64A is shallower than is the second reservoir depth 64B. Furthermore, cross-sections of the upper and lower stiffening lips 54A and 54B are shown so that their preferred structure is clearly depicted.

Figure 6A:
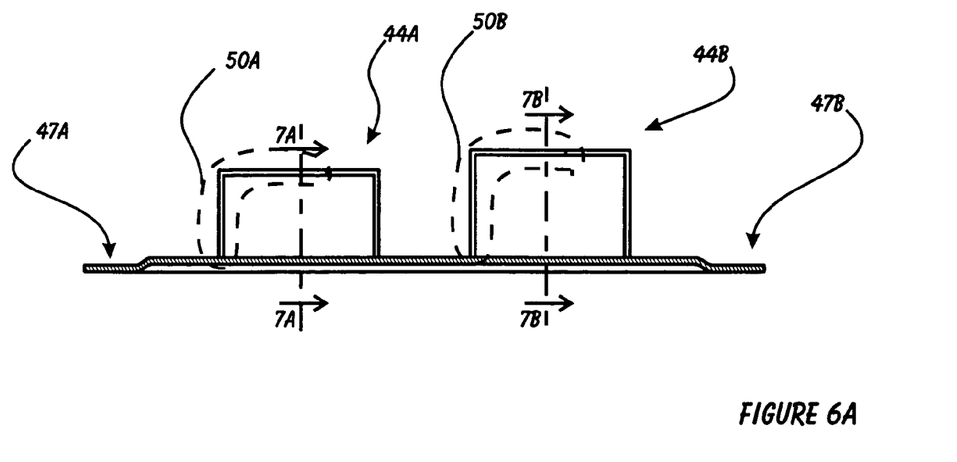
FIGS. 6A and 6B are top and bottom views of the bracket of FIGS. 3-5.
Figure 6B:
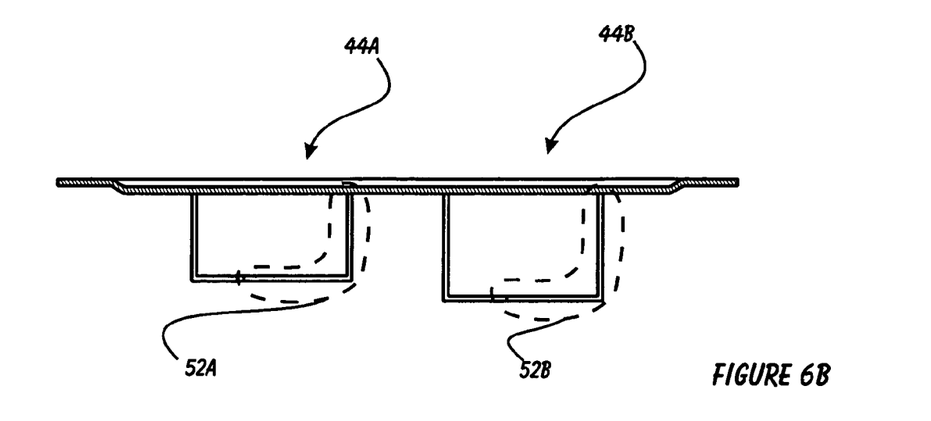

FIGS. 6A and 6B are top and bottom views of the bracket 40 of FIGS. 3-5. In FIG. 6A, the upper L-shaped brackets 50A and 50B are clearly depicted. In FIG. 6B, the lower L-shaped brackets 52A and 52B are clearly depicted. Again, in its preferred form, all of the L-shaped brackets are formed from the material cut out to form the outlet box apertures, which is then bent into an L shape. The L-shaped brackets, therefore, all have an end that extends from the face plate, and an end opposite to this attached end that is free. Finally turning to FIGS. 7A and 7B, we can see how a deep outlet box inserted into each of the two reservoirs would appear.

Figure 7A:
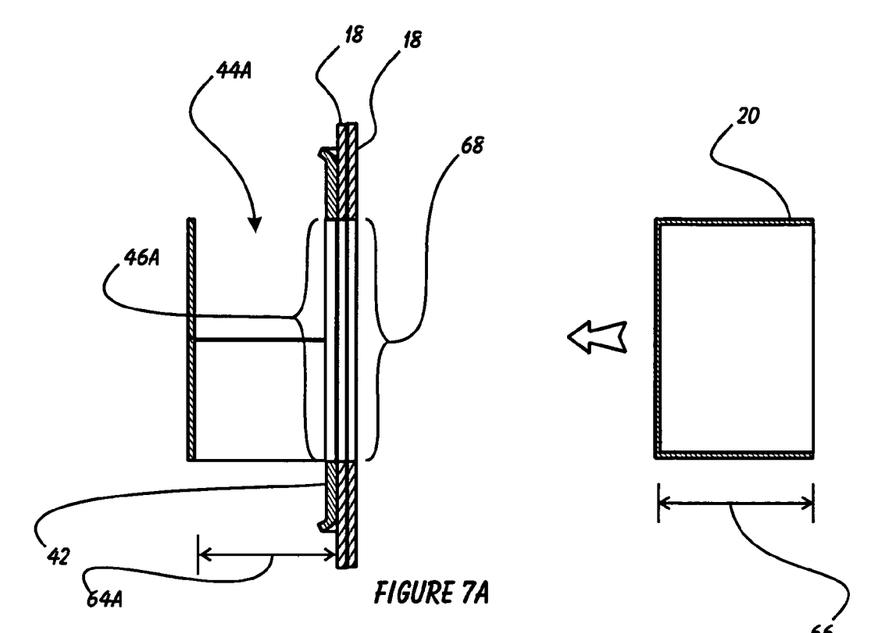
FIGS. 7A and 7B are cutaway side views of the bracket of FIGS. 3-6.
Figure 7B:
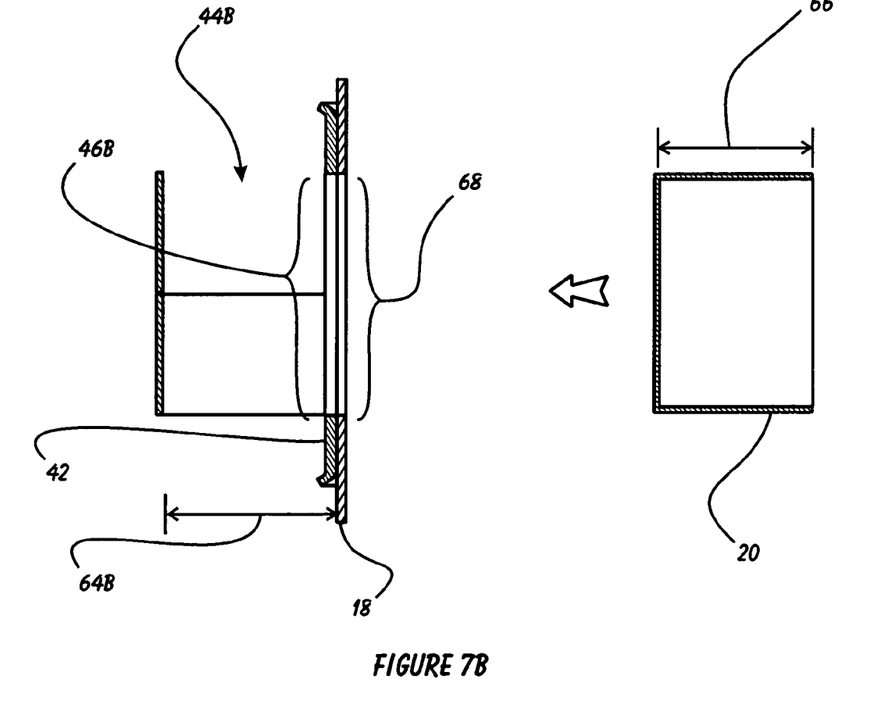

FIGS. 7A and 7B are cutaway side views of the bracket of FIGS. 3-6. As shown, two layers of drywall 18 have been applied over the face plate 42 (and studs, of course). The outlet box 20, would have been installed into the first reservoir 44A prior to the drywall installation; the outlet box depth 66 of 3.5 inches would leave the rim of the box 20 extending out from the front of the studs a distance equal to a pair of sheets of drywall.

As the drywall is being installed, a wall opening 68 is cut into each piece of drywall (around the already-installed outlet box 20). The depth of the first reservoir 44A results in the outlet box 20 rim being essentially even with the outer surface of the wall.

Similarly, the second outlet box reservoir 44B has a depth 64B that will result in an installed deep outlet box rim being equal to the outer surface of a wall constructed from a single sheet of drywall 18.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A mounting bracket, comprising:
   a face plate defined by a front face, a back face, opposing side edges and first and second junction box apertures formed in said face plate; and
   first and second junction box reservoirs, said first reservoir accessed through said first aperture and said second reservoir accessed through said second reservoir, said first junction box reservoir defining a first depth being the distance between a first reservoir back wall and said face plate, said second junction box reservoir defining a second depth being the distance between a second reservoir back wall and said face plate, said first and second depths being unequal, said first aperture juxtaposed over said first reservoir back wall and said second aperture juxtaposed over said second reservoir back wall.

2. The bracket of claim 1, wherein said first junction box reservoir is defined by upper and lower side walls and said first reservoir back wall, said first reservoir back wall comprising upper and lower backing plates in relative planar alignment and in spaced relation to said face plate by said first depth.

3. The bracket of claim 2, wherein said upper side wall comprises an upper side plate extending backwardly from said face plate, said upper backing plate extending contiguously from said upper side plate.

4. The bracket of claim 3, wherein said lower side wall comprises a lower side plate extending backwardly from said face plate, said upper backing plate extending contiguously from said upper side plate.

5. The bracket of claim 4, wherein said first depth defined by said first junction box reservoir comprises the length of said upper and lower side plates.

6. The bracket of claim 5, wherein said second junction box reservoir is defined by second upper and lower side walls and said second reservoir back wall, said second reservoir back wall comprising second upper and lower backing plates in relative planar alignment and in spaced relation to said face plate.

7. The bracket of claim 6, wherein said second upper side wall comprises a second upper side plate extending backwardly from said face plate, said second upper backing plate extending contiguously from said second upper side plate.

8. The bracket of claim 7, wherein said second lower side wall comprises a second lower side plate extending backwardly from said face plate, said second upper backing plate extending contiguously from said second upper side plate.

9. The bracket of claim 8, wherein said second depth defined by said second junction box reservoir comprises the length of said second upper and lower side plates, said first and second depths being unequal.

10. A mounting bracket
- a face plate defined by a front face, a back face, opposing side edges and first and second junction box apertures formed in said face plate; and
- first and second junction box reservoirs, said first reservoir accessed through said first aperture and defining a first reservoir depth and said second reservoir accessed through said second reservoir and defining a second reservoir depth, said first reservoir depth and said second reservoir depth being unequal said first junction box reservoir is further defined by upper and lower side walls and a back wall, said back wall comprising upper and lower backing plates in relative spaced relation to said face plate;
- whereby said face plate and said first and second reservoirs are formed from a single unitary piece of thin metal.

11. The bracket of claim 10, wherein:
- said upper side wall comprises an upper side plate extending backwardly from said face plate, said upper backing plate extending contiguously from said upper side plate; and
- said lower side wall comprises a lower side plate extending backwardly from said face plate, said upper backing plate extending contiguously from said upper side plate.

12. The bracket of claim 11, wherein said second junction box reservoir is defined by second upper and lower side walls and a second back wall, said second back wall comprising second upper and lower backing plates in relative planar alignment and in spaced relation to said face plate.

13. The bracket of claim 12, wherein:
- said second upper side wall comprises a second upper side plate extending backwardly from said face plate, said second upper backing plate extending contiguously from said second upper side plate; and
- said second lower side wall comprises a second lower side plate extending backwardly from said face plate, said second upper backing plate extending contiguously from said second upper side plate.

14. The bracket of claim 13, wherein said first junction box reservoir defines a first depth of about 2.25 inches.

15. The bracket of claim 14, wherein said second junction box reservoir defines a second depth of about 2.75 inches.

16. A mounting bracket, comprising:
- a generally planar face plate defining a front face and a back face;
- a first junction box aperture cut in said face plate;
- a first upper L-bracket extending backwardly from said face plate and defined by a first plate member having a first end attached to said face plate adjacent to an edge of said first junction box aperture and an opposite end, said first plate member defining a first length, and a second plate member defined by a first end attached to said opposite end of said first plate member and a free distal end opposite said first end;
- a first lower L-bracket extending backwardly from said face plate and defined by a first plate member having a first end attached to said face plate adjacent an opposite edge of said first junction box aperture and an opposite end, said first lower L-bracket first plate member defining a length substantially the same as said first length, and a second plate member defined by a first end attached to said opposite end of said first plate member and a free distal end opposite said first end;
- a second upper L-bracket extending backwardly from said face plate and defined by a first plate member having a first end attached to said face plate adjacent to an edge of said first junction box aperture and an opposite end, said first plate member defining a second length and a second plate member defined by a first end attached to said opposite end of said first plate member and a free distal end opposite said first end; and
- a second lower L-bracket extending backwardly from said face plate and defined by a first plate member having a first end attached to said face plate adjacent an opposite edge of said first junction box aperture and an opposite end, said first lower L-bracket first plate member defining a length substantially the same as said second length, and a second plate member defined by a first end attached to said opposite end of said first plate member and a free distal end opposite said first end.

17. The bracket of claim 16, wherein said face plate further comprises a coplanar first mounting fin extending from a first side of said face plate and a coplanar second mounting fin extending from a second side of said face plate opposite from said first mounting fin.

18. The bracket of claim 17, wherein said face plate further comprises an upper stiffening lip and a lower stiffening lip formed at respective upper and lower edges of said face plate.

* * * * *